United States Patent
Yue (10) Patent No.: US 7,905,536 B2
(45) Date of Patent: Mar. 15, 2011

(54) CLAMP STRUCTURE FOR TONNEAU COVER

(75) Inventor: Shiawdar Shaun Yue, Cupertino, CA (US)

(73) Assignee: CYC Engineering, Inc., Fremont, CA (US)

( * ) Notice: Subject to any disclaimer, the term of this patent is extended or adjusted under 35 U.S.C. 154(b) by 136 days.

(21) Appl. No.: 12/429,822

(22) Filed: Apr. 24, 2009

(65) Prior Publication Data

US 2010/0270824 A1 Oct. 28, 2010

(51) Int. Cl.
*B60P 15/06* (2006.01)

(52) U.S. Cl. .................................. 296/100.07

(58) Field of Classification Search ............ 296/100.07, 296/100.01, 100.17, 100.06, 100.1, 100.15, 296/100.16, 100.18, 37.6, 100.09, 100.02
See application file for complete search history.

(56) References Cited

U.S. PATENT DOCUMENTS

| | | | | |
|---|---|---|---|---|
| 4,159,137 A | * | 6/1979 | Richter | 292/123 |
| 5,527,014 A | * | 6/1996 | Bracewell | 254/15 |
| 5,636,893 A | * | 6/1997 | Wheatley et al. | 296/100.07 |
| 6,827,531 B2 | * | 12/2004 | Womack et al. | 410/104 |
| 6,893,073 B2 | * | 5/2005 | Wheatley | 296/100.15 |
| 7,188,888 B2 | | 3/2007 | Wheatley et al. | |
| 7,258,387 B2 | | 8/2007 | Weldy | |
| 7,322,633 B2 | * | 1/2008 | Zajicek et al. | 296/100.06 |
| 7,334,830 B2 | * | 2/2008 | Weldy | 296/100.09 |
| 7,530,614 B2 | * | 5/2009 | Nichols | 296/3 |
| 7,628,442 B1 | * | 12/2009 | Spencer et al. | 296/100.07 |
| 7,823,957 B2 | * | 11/2010 | Williamson et al. | 296/100.16 |
| 2006/0208524 A1 | * | 9/2006 | Brown et al. | 296/100.01 |
| 2007/0271745 A1 | * | 11/2007 | Frey | 24/568 |
| 2008/0129077 A1 | * | 6/2008 | Weldy | 296/136.03 |
| 2009/0274531 A1 | * | 11/2009 | Townson | 410/104 |
| 2010/0038926 A1 | | 2/2010 | Williamson et al. | |

* cited by examiner

*Primary Examiner* — Kiran B. Patel (57) ABSTRACT

A clamp structure for a tonneau cover is disclosed and mounted to one frame section of a tonneau cover for releasably securing the frame section on a cargo bed of a pick-up truck. The clamp comprises: a foundation rail having two side grooves and a recess formed between the two side grooves; and a sliding block having two side hangers extended into and slidably moving along the two side grooves and a pivotal portion received in the recess; a clamp bolt; a grip element; and a handle. The side hangers of the sliding block is used to slidably move along the side grooves of the foundation rail, so that the sliding movement of the clamp structure pivotally connected to the sliding block in relation to the foundation rail is more stable and smooth based on two strong support points of the two side hangers in the two side grooves.

20 Claims, 6 Drawing Sheets

CLAMP STRUCTURE FOR TONNEAU COVER

FIELD OF THE INVENTION

The present invention relates to a clamp structure for a tonneau cover, and more particularly to a clamp structure for a tonneau cover of a pick-up truck.

BACKGROUND OF THE INVENTION

A pick-up truck has a cargo bed used to carry various cargos. Generally, the cargo bed is covered by a tonneau cover which is releasably clamped to and extended above the cargo bed, so as to protect the carried cargos from adverse weather and improve the aesthetic appearance of the pick-up truck. The tonneau covers can be classified into hard-top type and soft-top type, wherein the hard-top type tonneau cover has a hard top made of metal, fiberglass or the like, while the soft-top type tonneau cover has a soft top made of canvas, vinyl plastic or a weather-resistant fabric.

In general, although the hard-top tonneau cover provides greater security for cargo and can be more easily clamped on the cargo bed of the pick-up truck, it is heavier than the soft-top tonneau cover, and it needs more storage space for storing the hard-top tonneau cover after being removed from the pick-up truck. Furthermore, the soft-top tonneau cover is lighter in weight, and the volume thereof is more compact for storage. Meanwhile, both of the hard-top tonneau cover and the soft-top tonneau cover need to provide clamps for securely clamping the tonneau cover to the pick-up truck.

For example, U.S. Pat. No. 7,334,830 discloses a tonneau cover for the bed of a pick up truck, which comprises: three sections, each of which includes a frame having two side rails joined by two support rails; a flexible cover overlaying and connected to each of the sections, wherein the side rails of the three sections are hinged together, so as to allow one of the sections to fold onto another adjacent section; and at least one clamp is mounted to the frame of one of the sections, wherein the clamp is used to releasably secure the sections to the pick up truck. The clamp includes: a base portion fixed with respect to the frame of one of the sections; an arm connected to the base; a truck grip member movably mounted on the arm; and a cam lock adjustably mounted on the arm and movably engaging the truck grip member, wherein the base portion is integrated into one of said support rails and the base portion includes a slotted track for receiving the arm, the arm is formed as a threaded post mounted within the slotted track and movable along the track, the truck grip member includes an engaging portion for engaging a surface of a bed wall of the pick up truck.

However, in the '830 patent, the truck grip member and the cam lock are moved along the slotted track by the arm, but the sliding movement of the arm in relation to the slotted track is generally unstable and not smooth due to a single support point of the threaded post of the arm in the slotted track. Further, the threaded post of the arm must strongly abut against an inner edge of the slotted track of the base portion when the engaging portion of the truck grip member is engaged with the bed wall of the pick up truck. After long-term use, the inner edge of the slotted track of the base portion may deform outwardly by the abutment of the threaded post of the arm, so as to increase the distance between the engaging portion of the truck grip member and the bed wall of the pick up truck, resulting in a loose clamping relationship therebetween. In addition, the threaded post of the arm also may deform due to abutting against the inner edge of the slotted track. If the width of the deformed threaded post is smaller than the width of the slotted track, the deformed threaded post of the arm may depart from the slotted track of the base portion, resulting in the structural damage of the clamp.

Moreover, U.S. Pat. No. 7,258,387 discloses a similar clamp for securing a tonneau cover to the rail of a truck bed sidewall, the clamp comprises: a base adapted for securing the cover to the truck bed sidewall; a handle connected at one end by an elongated fastener to the base; a cam part located between the base and the handle, wherein the handle includes a beveled cam surface, the cam part includes a follower in contact with the cam surface. Therefore, the cam part can shift toward and away from the base as the follower is moved along the cam surface when the handle is rotated about a longitudinal axis of the fastener between an open position and a closed position of the cover. The cam part includes an engagement part for making clamping contact with the truck bed sidewall when the handle is in its closed position.

Similarly, in the '387 patent, because the cam part and the handle are moved along a slot of the base by the fastener, but the sliding movement of the fastener in relation to the slot is generally unstable and not smooth due to a single support point of an inner end of the fastener in the slot. Further, the inner end of the fastener must strongly abut against an inner edge of the slot of the base when the engagement part of the cam part is engaged with the bed wall of the pick up truck. After long-term use, the inner edge of the slot of the base may deform outwardly by the abutment of the inner end of the fastener, so as to increase the distance between the engagement part of the cam part and the bed wall of the pick up truck, resulting in a loose clamping relationship therebetween. In addition, the inner end of the fastener also may deform due to abutting against the inner edge of the slot. If the width of the deformed inner end is smaller than the width of the slot, the deformed inner end of the fastener may depart from the slot of the base, resulting in the structural damage of the clamp.

As a result, it is important for related designers and manufacturers to think how to develop a clamp structure for a tonneau cover of a pick-up truck, in order to solve the problems existing in the conventional clamps, as described above.

SUMMARY OF THE INVENTION

A primary object of the present invention is to provide a clamp structure for a tonneau cover, which has a sliding block provided with a pair of side hangers for slidably moving along a pair of side grooves of a foundation rail connected to a rail of a tonneau cover, so that the sliding movement of a clamp structure pivotally connected to the sliding block in relation to the foundation rail is more stable and smooth based on two strong support points of the two side hangers of the sliding block in the two side grooves of the foundation rail.

A secondary object of the present invention is to provide a clamp structure for a tonneau cover, wherein the two side hangers of the sliding block and the two side grooves of the foundation rail have corresponding dovetailed shape to provide higher structural strength, so that the two side hangers of the sliding block can strongly abut against an inner surface of the two side grooves of the foundation rail and not depart from the side grooves, while the deformation of the side hangers or the side grooves can be prevented when an engaging portion of a grip element is engaged with a bed wall of the pick-up truck.

A third object of the present invention is to provide a clamp structure for a tonneau cover, wherein the two side hangers of the sliding block and the two side grooves of the foundation rail have corresponding chamfer portions to provide higher sliding smoothness, so that the sliding block can slide more smoothly in relation to the foundation rail without jamming when the two side hangers slidably move along the two side grooves.

To achieve the above object, the clamp structure for a tonneau cover of a preferred embodiment of the present invention is mounted to one of at least two frame sections of a tonneau cover, wherein the clamp is used to releasably secure the frame sections on a cargo bed of a pick-up truck, wherein the clamp comprises: a foundation rail connected to one of the frame sections, and having two side grooves formed on two side surfaces of the foundation rail, and a recess formed between the two side grooves; a sliding block having two side hangers extended into the two side grooves and slidably moving along the two side grooves, and a pivotal portion received in the recess; a clamp bolt having a first pivotal end pivotally connected to the pivotal portion of the sliding block, and a second pivotal section; a grip element movably mounted on the clamp bolt and having an engaging portion; and a handle pivotally connected to the second pivotal section of the clamp bolt and having a cam surface to abut against the grip element, so as to control the engaging portion of the grip element to engage with a surface of a bed wall of the pick-up truck.

In one embodiment of the present invention, the sliding block further comprises a notch which is extended from a lower surface of the sliding block to one side surface thereof, and the clamp bolt can be shifted into the notch to move to a storage position.

In one embodiment of the present invention, the sliding block further comprises a through hole passed through the pivotal portion and communicated with the notch, and a pivotal element extended through the through hole to pivotally connect the first pivotal end of the clamp bolt to the pivotal portion.

In one embodiment of the present invention, one of the side surfaces of the foundation rail further comprises an indentation which is communicated with the recess, and the clamp bolt can be shifted into the indentation to move to a storage position.

In one embodiment of the present invention, the notch of the sliding block is aligned with the indentation of the foundation rail when the clamp structure is in the storage position.

In one embodiment of the present invention, each of the side hangers of the sliding block is a dovetailed portion having an enlarged distal end, and each of the side grooves of the foundation rail is a dovetailed groove having a narrow opening and corresponding to the dovetailed portion.

In one embodiment of the present invention, a lower inner corner of each of the two side grooves is formed with a first chamfer portion, and a lower outer corner of each of the two side hangers is formed with a second chamfer portion corresponding to the first chamfer portion.

In one embodiment of the present invention, the pivotal portion of the sliding block is received in the recess of the foundation rail without contacting an inner surface of the recess.

In one embodiment of the present invention, the foundation rail is connected to an inner rail of one of the frame sections.

In one embodiment of the present invention, the foundation rail is connected to an outer rail of one of the frame sections.

In one embodiment of the present invention, the clamp structure for a tonneau cover of a preferred embodiment of the present invention is mounted to a single frame section of a tonneau cover, wherein the clamp is used to releasably secure the frame section on a cargo bed of a pick-up truck, wherein the clamp comprises: a foundation rail connected to the frame section, and having two side grooves formed on two side surfaces of the foundation rail, and a recess formed between the two side grooves; a sliding block having two side hangers extended into the two side grooves and slidably moving along the two side grooves, and a pivotal portion received in the recess; a clamp bolt having a first pivotal end pivotally connected to the pivotal portion of the sliding block, and a second pivotal section; a grip element movably mounted on the clamp bolt and having an engaging portion; and a handle pivotally connected to the second pivotal section of the clamp bolt and having a cam surface to abut against the grip element, so as to control the engaging portion of the grip element to engage with a surface of a bed wall of the pick-up truck.

DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
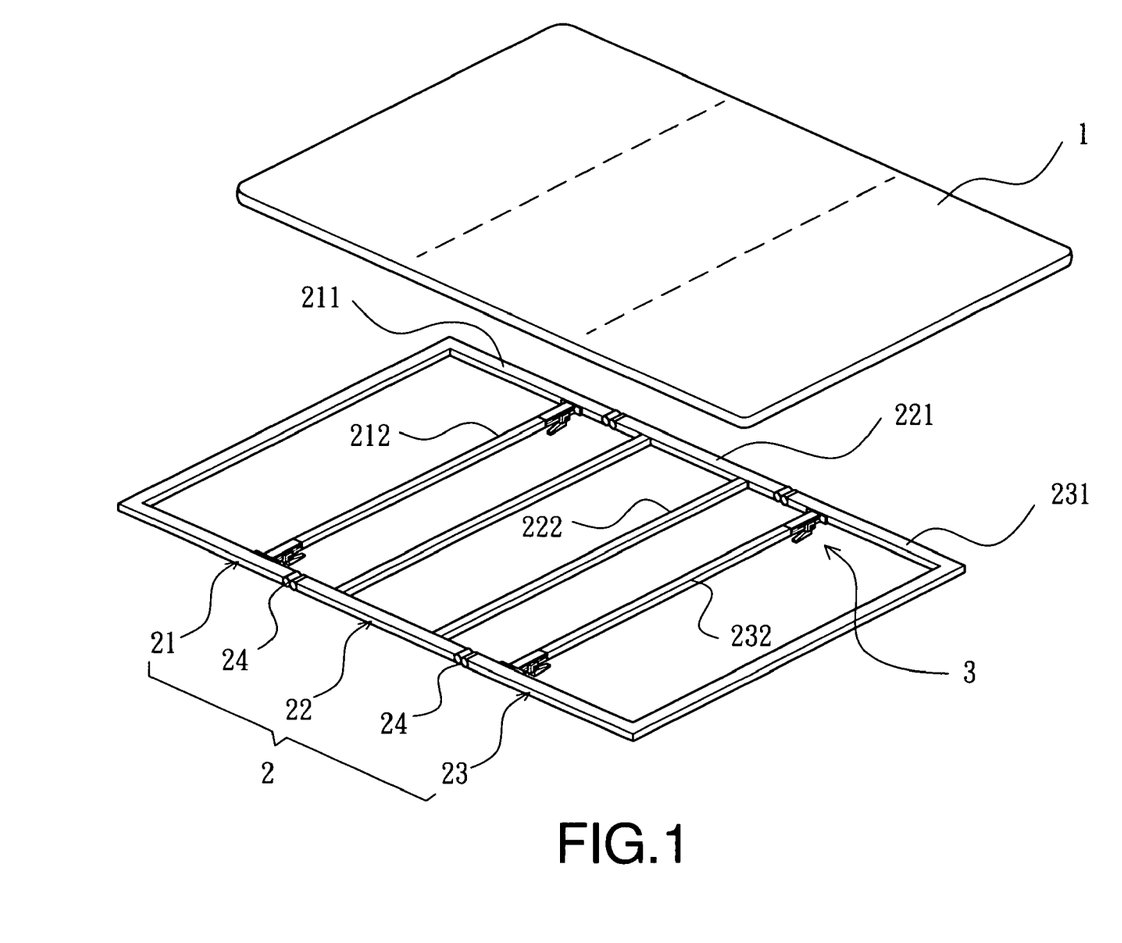
FIG. 1 is an exploded perspective view of a tonneau cover according to a preferred embodiment of the present invention.
Figure 2:
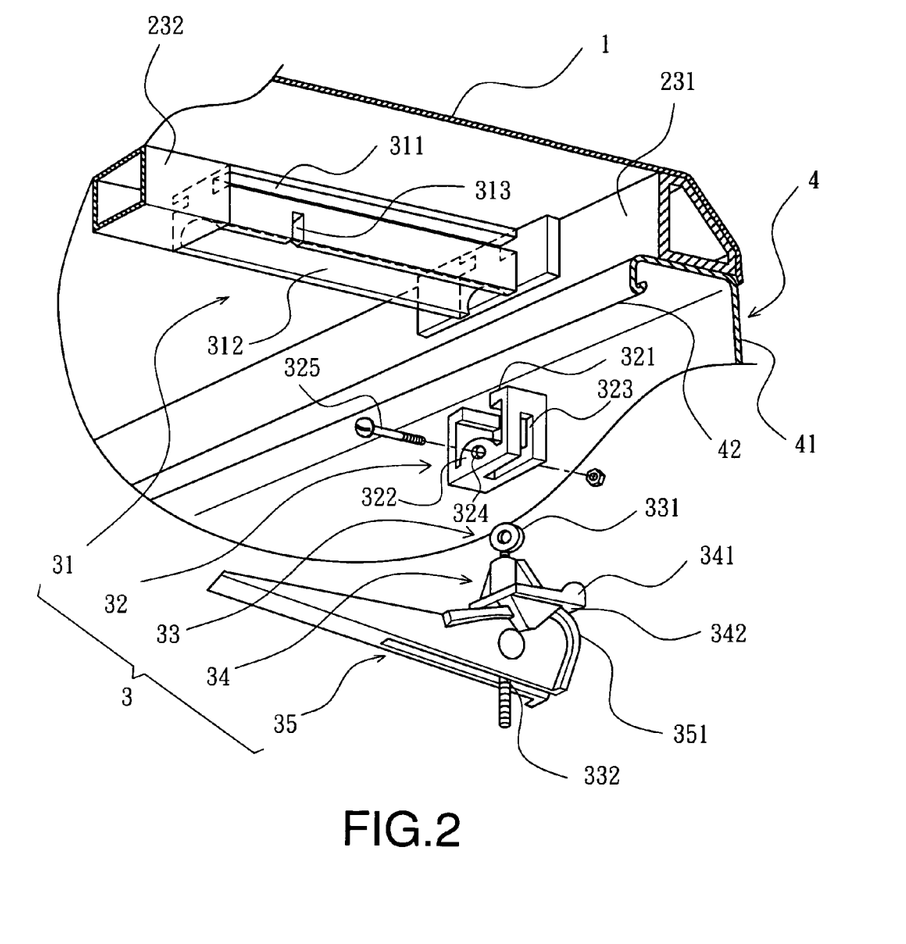
FIG. 2 is a partially enlarged view of a clamp structure for the tonneau cover according to the preferred embodiment of the present invention.
Figure 3:
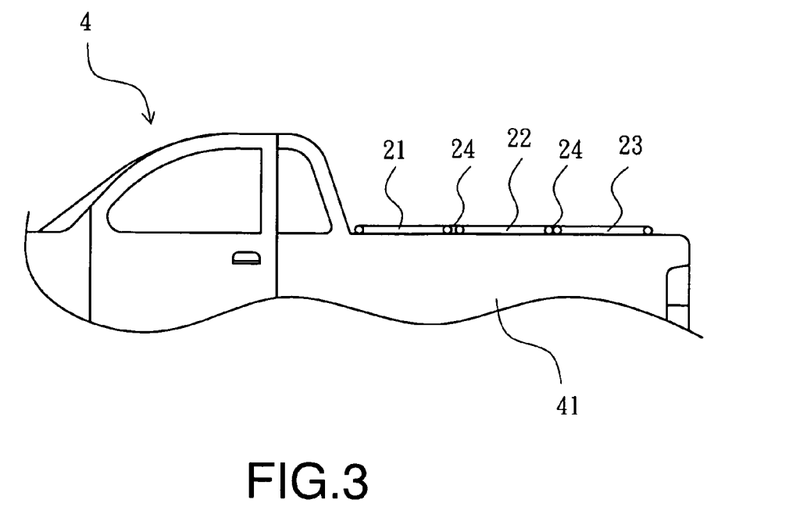
FIG. 3 is a schematic view of the tonneau cover in an extended position according to the preferred embodiment of the present invention.

Referring now to FIGS. 1 and 2, a tonneau cover and a clamp structure therefor according to a preferred embodiment of the present invention are illustrated. As shown, the tonneau cover comprises a flexible cover 1, a foldable frame 2 and at least one clamp structure 3. The tonneau cover is used to cover a cargo bed of a pick-up truck 4, as shown in FIG. 3, and releasably clamped to a surface of at least one side wall 41 of the cargo bed by the clamp structure 3, so as to protect cargos carried in the cargo bed of the pick-up truck from adverse weather and improve the aesthetic appearance of the pick-up truck.

Referring to FIGS. 1 and 2, in the preferred embodiment of the present invention, the flexible cover 1 is made of flexible material, such as canvas, vinyl plastic, a weather-resistant fabric or other equivalent flexible material, but not limited thereto. The flexible cover 1 is suitable fixed on the foldable frame 2, and can be simultaneously folded when the foldable frame 2 is folded. The foldable frame 2 includes at least two frame sections and at least two hinges. For example, in the embodiment, the foldable frame 2 includes a first frame section 21, a second frame section 22, a third frame section 23 and two pairs of hinges 24. However, in other embodiment, the amount of the frame sections can be two, four or more than four, while the amount of the hinge can be varied according the amount of the frame sections. The first frame section 21 mainly has a plurality of outer rails 211 and at least one inner rail 212, wherein the outer rails 211 define the outline of the first frame section 21, and the inner rail 212 is extended from left to right of the outer rails 211 to increase the supporting strength of the first frame section 21. Similarly, the second frame section 22 has a plurality of outer rails 221 and at least one inner rail 222, while the third frame section 22 has a plurality of outer rails 231 and at least one inner rail 232. All of the outer rails 211, 221, 231 and the inner rails 212, 222, 232 are selected from various rails made of metal (such as steel, stainless steel, copper, aluminum, equivalent rigid metal or alloy thereof), engineering plastic or even wood, while the cross-sectional shape thereof is preferably square, rectangular, circular or polygonal, without limitation. Furthermore, the outer rails 211, 221, 231 and the inner rails 212, 222, 232 can be installed in a detachable way or in an un-detachable way according to actual needs of the tonneau cover. Furthermore, it should be noted that the foldable frame 2 of the present invention may optionally include a single frame section, while the cover 1 can be flexible or rigid in an alternative embodiment (not shown).

Figure 2A:
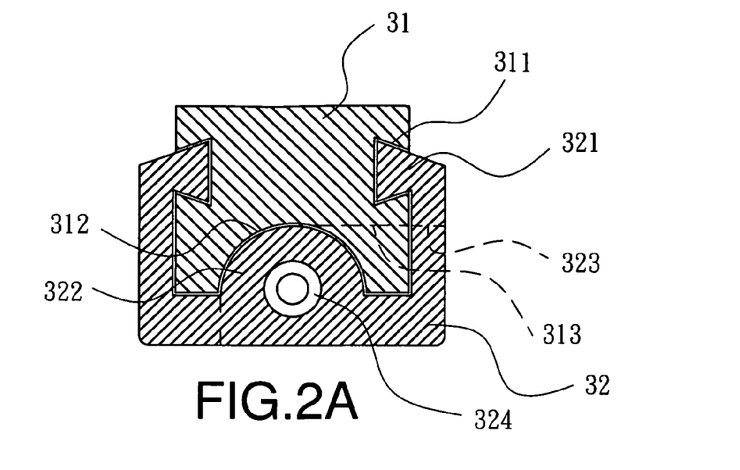
FIGS. 2A and 2B are assembled cross-sectional views of a sliding block and a foundation rail for the clamp structure according to the preferred embodiment of the present invention.
Figure 2B:
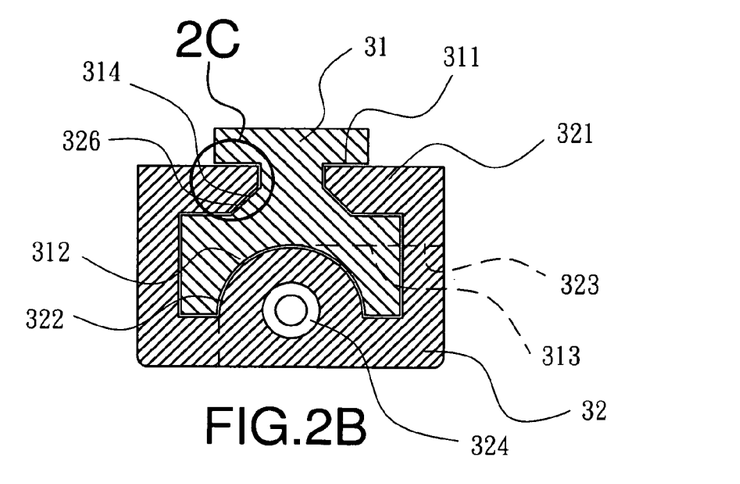
Figure 2C:
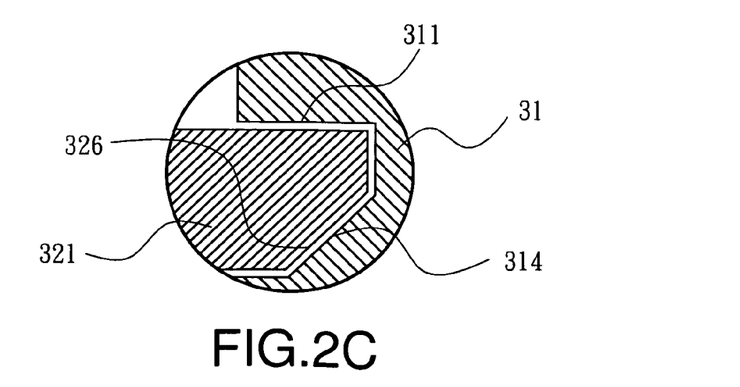
FIG. 2C is a partially enlarged cross-sectional view of FIG. 2B according to the preferred embodiment of the present invention.

Referring now to FIGS. 1, 2 and 2A, in the preferred embodiment of the present invention, the clamp structure 3 can be optionally installed on at least one of the inner rails 212, 222, 232 and the outer rails 211, 221, 231. The clamp structure 3 comprises: a foundation rail 31, a sliding block 32, a clamp bolt 33, a grip element 34 and a handle 35. In the embodiment, the foundation rail 31 is a portion made of metal, engineering plastic or other equivalent rigid material and used to connect to a rail of one of the frame sections 21, 22, 23. For example, the foundation rail 31 is connected to the inner rail 232 of the third frame section 23 by means of welding, screw-connecting, inserting, engaging, or other possible connection method. In another embodiment, one end of the foundation rail 31 may be independently connected to the right (or left) outer rail 231 of the third frame section 23, while the other end thereof has a barrier block (not-shown) to limit the sliding of the sliding block 32, wherein the other end will not be connected to the inner rail 232 (not-shown). Alternatively, the foundation rail 31 may be connected to the rearmost outer rail 231 of the third frame section 23 (or the frontmost outer rail 211 of the first frame section 21). The foundation rail 31 has two side grooves 311 formed on two side surfaces of the foundation rail 31, and a recess 312 formed between the two side grooves 311. Each of the side grooves 311 is a dovetailed groove extended along each of the side surfaces of the foundation rail 31, having a narrow opening which will be described more detailed hereinafter. The recess 312 is formed on a lower surface of the foundation rail 31 between the two side surfaces, while the shape of the recess 312 is preferably semi-circular, curved, square, rectangular, or polygonal, without limitation. In addition, one of the side surfaces of the foundation rail 31 further comprises an indentation 313 which is communicated with the recess 312, and the clamp bolt 33 can be shifted into the indentation 313 to move to a storage position.

Referring still to FIGS. 1, 2 and 2A, in the preferred embodiment of the present invention, the sliding block 32 is made of metal, engineering plastic or other equivalent rigid material, and has two side hangers 321 and a pivotal portion 322. The two side hangers 321 are formed on two opposite sides of the sliding block 32 and facing each other. Each of the two side hangers 321 is a dovetailed portion having an enlarged distal end, wherein the dovetailed shape of the side hangers 321 is corresponding to that of the side grooves 311, so that each of the two side hangers 321 can be extended into each of the two side grooves 311 and slidably move along the two side grooves 311 without departing from the side grooves 311. The pivotal portion 322 is an inner protrusion having a shape substantially corresponding to that of the recess 312 and having a size slight smaller than that of the recess 312. Thus, when the sliding block 32 is installed on the foundation rail 31, the pivotal portion 322 of the sliding block 32 can be received in the recess 312 of the foundation rail 31 without contacting an inner surface of the recess 312. In addition, the sliding block 32 further comprises a notch 323 which is extended from a lower surface of the sliding block 32 to one side surface thereof, a stepped through hole 324 passed through the pivotal portion 322 and communicated with the notch 323, and a pivotal element 325 extended through the stepped through hole 324 to pivotally connect the clamp bolt 33 to the pivotal portion 322, wherein the pivotal element 325 can include a screw and a nut. When the clamp structure is in the storage position, the notch 323 of the sliding block 32 is aligned with the indentation 313 of the foundation rail 31, so that the clamp bolt 33 can be shifted into the notch 323 and the indentation 313 to move to its storage position.

Referring still to FIGS. 1, 2, 2B and 2C, in the preferred embodiment of the present invention, the two side grooves 311 of the foundation rail 31 and the two side hangers 321 of sliding block 32 can be suitably varied into different corresponding shape. For example, a lower inner corner of each of the two side grooves 311 can be formed with a first chamfer portion 314, while a lower outer corner of each of the two side hangers 321 can be formed with a second chamfer portion 326 corresponding to the first chamfer portion 314. Thus, when the two side hangers 321 slidably move along the two side grooves 311, the first chamfer portion 314 and the second chamfer portion 326 can lower the jamming risk of the side hangers 321 and the side grooves 311, so that the sliding block 32 will slide more smoothly in relation to the foundation rail 31.

Referring still to FIGS. 1, 2 and 2A, in the preferred embodiment of the present invention, the clamp bolt 33 is preferably made of metal, such as stainless steel, iron, copper, aluminum or alloy thereof. The clamp bolt 33 has a first pivotal end 331 and a second pivotal section 332. The first pivotal end 331 preferably has a pivotal hole which is inserted into the notch 323 and aligned with the stepped through hole 324, so that the pivotal element 325 can extend through the stepped through hole 324 and the first pivotal end 331 to pivotally connect the clamp bolt 33 on the pivotal portion 322. Thus, the clamp bolt 33 can rotate in relation to the pivotal portion 322 along the notch 323. Similarly, the second pivotal section 332 is the other end of the clamp bolt 33 opposite to the first pivotal end 331, and used to pivotally connect to the handle 35 in a similar manner. It should be noted that the actual pivotal position of the second pivotal section 332 can be adjusted and be not absolutely very close to the distal end of the clamp bolt 33.

Referring now to FIGS. 1 and 2, in the preferred embodiment of the present invention, the grip element 34 is made of metal, engineering plastic or other equivalent rigid material, and has a passage (not-shown), wherein the clamp bolt 33 can extend through the passage of the grip element 34, so that the grip element 34 can be movably mounted on the clamp bolt 33. The grip element 34 has an engaging portion 341 facing the sliding block 32, and a contact surface 342 facing the handle 35. When the tonneau cover is in an extended position and the clamp structure 3 of the present invention is in a locking position, the contact surface 342 will be pushed by the handle 35, and then the engaging portion 341 can engage with a flange surface 42 of a bed wall 41 of a pick-up truck 4. The handle 35 is pivotally connected to the second pivotal section 332 of the clamp bolt 33, and has a cam surface 351 to abut against the contact surface 342 of the grip element 34, so as to control the engaging portion 341 of the grip element 34 to engage with the flange surface 42 of the pick-up truck 4.

Figure 4:
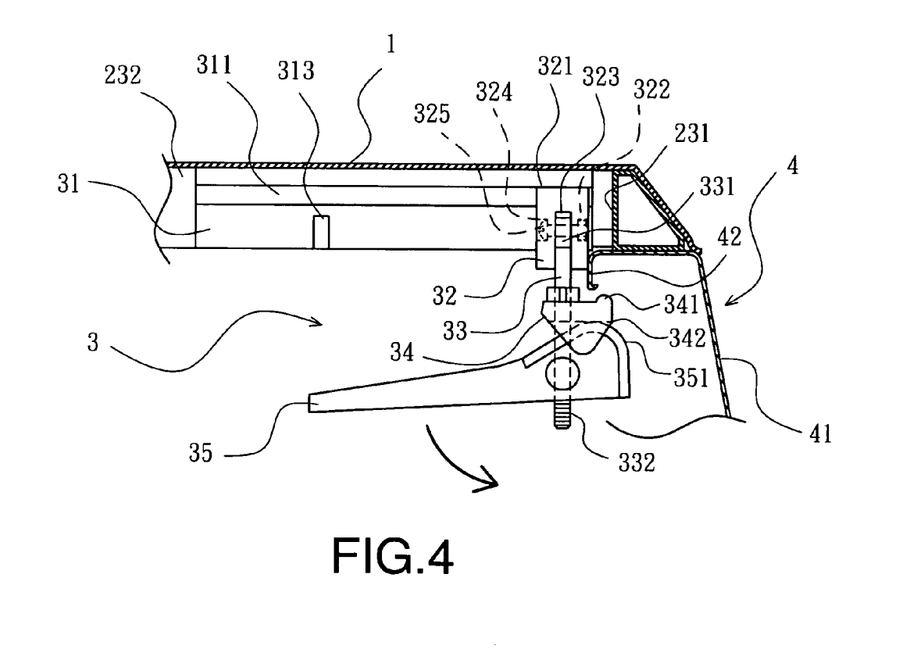
FIG. 4 is a side view of the clamp structure before clamping to a side wall of a pick-up truck according to the preferred embodiment of the present invention.
Figure 5:
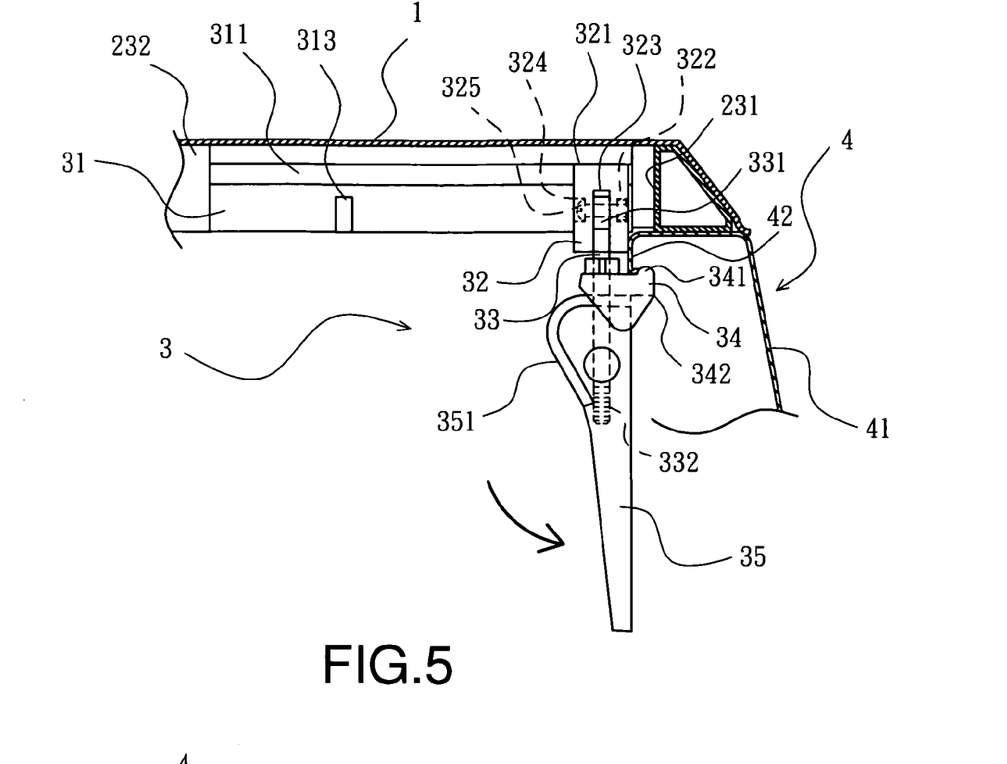
FIG. 5 is a side view of the clamp structure after clamping to the side wall of the pick-up truck according to the preferred embodiment of the present invention.

Referring now to FIGS. 3, 4 and 5, in the preferred embodiment of the present invention, when the tonneau cover having three frame sections 21, 22, 23 is used in the extended position, the clamp structure 3 of the present invention, as shown in FIGS. 2 and 2A, can be used to lock the tonneau cover on the bed wall 41 of the pick-up truck 4. Firstly, a user can manually hold the handle 35 to move the assembly of the sliding block 32, the clamp bolt 33, the grip element 34 and the handle 35, and the sliding block 32 will slide along an extended direction of the foundation rail 31, wherein each of the two side hangers 321 can be extended into each of the two side grooves 311 and slidably move along the two side grooves 311 without departing from the side grooves 311 due to the dovetailed shape of the side hangers 321 and the side grooves 311. During the sliding operation, the pivotal portion 322 of the sliding block 32 can be received in the recess 312 of the foundation rail 31 without contacting the inner surface of the recess 312. When the engaging portion 341 of the grip element 34 is moved to a locking position, the handle 35 can be manually rotated in related to the second pivotal section 332 of the clamp bolt 33, until the cam surface 351 of the handle 35 abuts against the contact surface 342 of the grip element 34, so as to vertical move the engaging portion 341 of the grip element 34 to engage with the flange surface 42 of the pick-up truck 4, as shown in FIGS. 4 and 5.

In the present invention, during the sliding operation, because the sliding block 32 is provided with a pair of the side hangers 321 for slidably moving along a pair of the side grooves 311 of the foundation rail 31 connected to one rail (such as the inner rail 232 of the third frame section 23) of a tonneau cover, the sliding movement of the clamp structure 3 pivotally connected to the sliding block 32 in relation to the foundation rail 31 is more stable and smooth based on two strong support points of the two side hangers 321 of the sliding block 32 in the two side grooves 311 of the foundation rail 31. In addition, during the locking operation, the engaging portion 341 of the grip element 34 is engaged with the flange surface 42 of the bed wall 41 of the pick-up truck 4, so as to generate a corresponding force to the two side hangers 321 of the sliding block 32. Because the two side hangers 321 and the two side grooves 311 of the foundation rail 31 have corresponding dovetailed shape to provide higher structural strength, the two side hangers 321 can strongly abut against an inner surface of the two side grooves 311 and not depart from the side grooves 311, while the deformation of the side hangers 321 or the side grooves 311 can be prevented.

Figure 6:
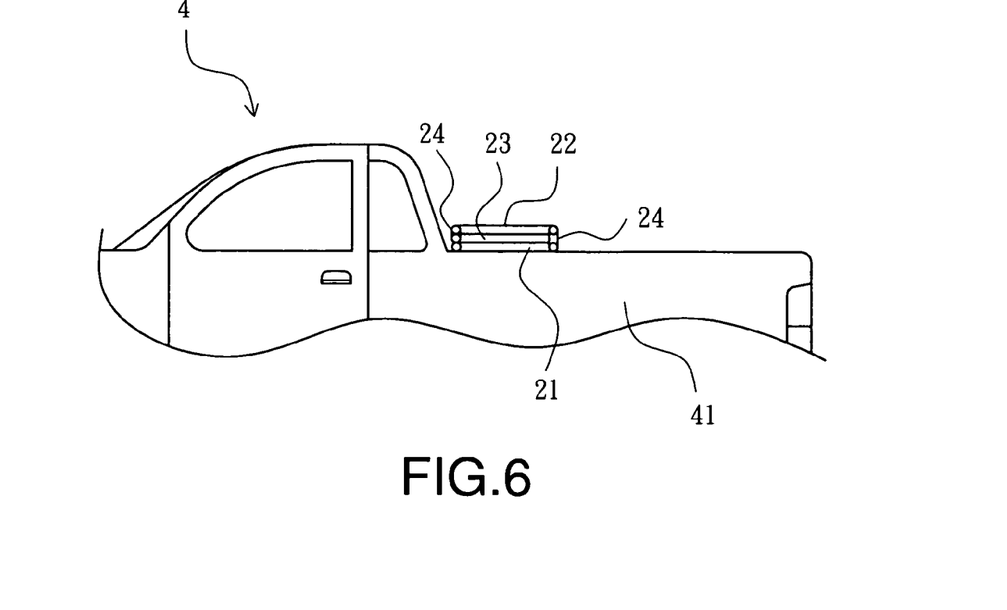
FIG. 6 is a schematic view of the tonneau cover in a storage position according to the preferred embodiment of the present invention.
Figure 7:
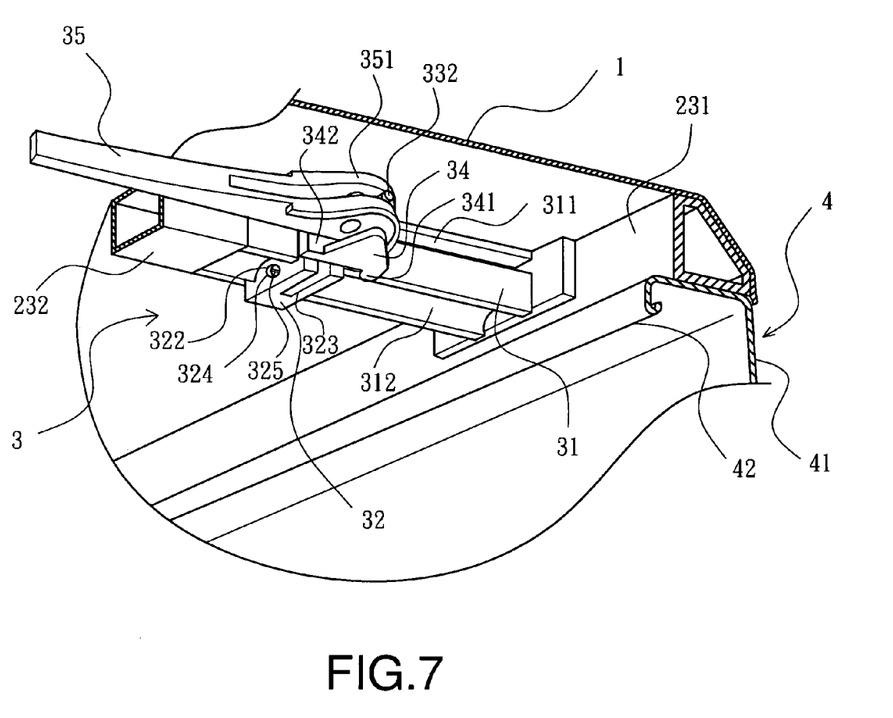
FIG. 7 is a perspective view of the clamp structure in a storage position according to the preferred embodiment of the present invention.

Referring now to FIGS. 6 and 7, in the preferred embodiment of the present invention, when the tonneau cover is folded into a storage position (i.e. a closed position), the clamp structure 3 of the present invention, as shown in FIGS. 2 and 2A, can be shifted into its storage position under the tonneau cover. Firstly, a user can manually hold the handle 35 to move the assembly of the sliding block 32, the clamp bolt 33, the grip element 34 and the handle 35, and the sliding block 32 will slide along an extended direction of the foundation rail 31, until the notch 323 of the sliding block 32 is aligned with the indentation 313 of the foundation rail 31. Then, the clamp bolt 33 can be shifted into the notch 323 and the indentation 313 in relation to the first pivotal end 331 thereof, so as to move the clamp structure 3 to the storage position. In the storage position, the handle 35 can be manually rotated toward the outer rail 231 of the third frame section 23 in relation to the second pivotal section 332 of the clamp bolt 33, so that the cam surface 351 of the handle 35 abuts against the contact surface 342 of the grip element 34 to vertical move the engaging portion 341 of the grip element 34 to engage with one side surface of the foundation rail 31 (not-shown). Therefore, the clamp structure 3 can be firmly positioned in the storage position without vibration, so as to ensure the operational reliability of the clamp structure 3.

The present invention has been described with a preferred embodiment thereof and it is understood that many changes and modifications to the described embodiment can be carried out without departing from the scope and the spirit of the invention that is intended to be limited only by the appended claims.

The invention claimed is:

1. A clamp structure for a tonneau cover, mounted to one of at least two frame sections of the tonneau cover for releasably securing the frame sections on a cargo bed of a pick-up truck, the clamp comprising:
    a foundation rail connected to one of the frame sections, and having two side grooves formed on two side surfaces of the foundation rail, and a recess formed between the two side grooves;
    a sliding block having two side hangers extended into the two side grooves and slidably moving along the two side grooves, and a pivotal portion received in the recess;
    a clamp bolt having a first pivotal end pivotally connected to the pivotal portion of the sliding block, and a second pivotal section;
    a grip element movably mounted on the clamp bolt and having an engaging portion; and
    a handle pivotally connected to the second pivotal section of the clamp bolt and having a cam surface to abut against the grip element, so as to control the engaging portion of the grip element to engage with a surface of a bed wall of the pick-up truck.

2. The clamp structure for the tonneau cover according to claim 1, wherein the sliding block further comprises a notch which is extended from a lower surface of the sliding block to one side surface thereof, and the clamp bolt can be shifted into the notch to move to a storage position.

3. The clamp structure for the tonneau cover according to claim 1, wherein the sliding block further comprises a through hole passed through the pivotal portion and communicated with the notch, and a pivotal element extended through the through hole to pivotally connect the first pivotal end of the clamp bolt to the pivotal portion.

4. The clamp structure for the tonneau cover according to claim 2, wherein one of the side surfaces of the foundation rail further comprises an indentation which is communicated with the recess, and the clamp bolt can be shifted into the indentation to move to a storage position.

5. The clamp structure for the tonneau cover according to claim 4, wherein the notch of the sliding block is aligned with the indentation of the foundation rail when the clamp structure is in the storage position.

6. The clamp structure for the tonneau cover according to claim 1, wherein each of the side hangers of the sliding block is a dovetailed portion having an enlarged distal end, and each of the side grooves of the foundation rail is a dovetailed groove having a narrow opening and corresponding to the dovetailed portion.

7. The clamp structure for the tonneau cover according to claim 1, wherein a lower inner corner of each of the two side grooves is formed with a first chamfer portion, and a lower outer corner of each of the two side hangers is formed with a second chamfer portion corresponding to the first chamfer portion.

8. The clamp structure for the tonneau cover according to claim 1, wherein the pivotal portion of the sliding block is received in the recess of the foundation rail without contacting an inner surface of the recess.

9. The clamp structure for the tonneau cover according to claim 1, wherein the foundation rail is connected to an inner rail of one of the frame sections.

10. The clamp structure for the tonneau cover according to claim 1, wherein the foundation rail is connected to an outer rail of one of the frame sections.

11. A clamp structure for a tonneau cover, mounted to a single frame section of the tonneau cover for releasably securing the frame section on a cargo bed of a pick-up truck, the clamp comprising:
- a foundation rail connected to the frame section, and having two side grooves formed on two side surfaces of the foundation rail, and a recess formed between the two side grooves;
- a sliding block having two side hangers extended into the two side grooves and slidably moving along the two side grooves, and a pivotal portion received in the recess;
- a clamp bolt having a first pivotal end pivotally connected to the pivotal portion of the sliding block, and a second pivotal section;
- a grip element movably mounted on the clamp bolt and having an engaging portion; and
- a handle pivotally connected to the second pivotal section of the clamp bolt and having a cam surface to abut against the grip element, so as to control the engaging portion of the grip element to engage with a surface of a bed wall of the pick-up truck.

12. The clamp structure for the tonneau cover according to claim 11, wherein the sliding block further comprises a notch which is extended from a lower surface of the sliding block to one side surface thereof, and the clamp bolt can be shifted into the notch to move to a storage position.

13. The clamp structure for the tonneau cover according to claim 11, wherein the sliding block further comprises a through hole passed through the pivotal portion and communicated with the notch, and a pivotal element extended through the through hole to pivotally connect the first pivotal end of the clamp bolt to the pivotal portion.

14. The clamp structure for the tonneau cover according to claim 12, wherein one of the side surfaces of the foundation rail further comprises an indentation which is communicated with the recess, and the clamp bolt can be shifted into the indentation to move to a storage position.

15. The clamp structure for the tonneau cover according to claim 14, wherein the notch of the sliding block is aligned with the indentation of the foundation rail when the clamp structure is in the storage position.

16. The clamp structure for the tonneau cover according to claim 11, wherein each of the side hangers of the sliding block is a dovetailed portion having an enlarged distal end, and each of the side grooves of the foundation rail is a dovetailed groove having a narrow opening and corresponding to the dovetailed portion.

17. The clamp structure for the tonneau cover according to claim 11, wherein a lower inner corner of each of the two side grooves is formed with a first chamfer portion, and a lower outer corner of each of the two side hangers is formed with a second chamfer portion corresponding to the first chamfer portion.

18. The clamp structure for the tonneau cover according to claim 11, wherein the pivotal portion of the sliding block is received in the recess of the foundation rail without contacting an inner surface of the recess.

19. The clamp structure for the tonneau cover according to claim 11, wherein the foundation rail is connected to an inner rail of the frame section.

20. The clamp structure for the tonneau cover according to claim 11, wherein the foundation rail is connected to an outer rail of the frame section.

* * * * *